United States Patent [19]

Miyamoto

[11] 4,247,947
[45] Jan. 27, 1981

[54] MOBILE RADIO DATA COMMUNICATION SYSTEM

[75] Inventor: Tsutomu Miyamoto, Tokyo, Japan

[73] Assignee: Nippon Electric Co., Ltd., Tokyo, Japan

[21] Appl. No.: 78,757

[22] Filed: Sep. 25, 1979

[30] Foreign Application Priority Data

Sep. 25, 1978 [JP] Japan ................... 53/117610

[51] Int. Cl.³ .................... H04B 7/26; H04M 11/06
[52] U.S. Cl. ......................... 455/38; 179/1 SB;
    179/2 DP; 179/2 EB; 455/54; 455/58
[58] Field of Search ............. 179/1 SA, 1 SB, 2 R,
    179/2 DP, 2 E, 2 EA, 2 EB, 2 EC, 84 R, 84
    VF; 340/311; 370/91, 92, 93; 455/31, 33, 34,
    38, 49, 53, 54, 56, 58

[56] References Cited

U.S. PATENT DOCUMENTS

| | | | |
|---|---|---|---|
| 3,376,509 | 4/1968 | Willcox et al. | 179/2 DP |
| 3,808,537 | 4/1974 | Sarati et al. | 455/54 |
| 4,029,901 | 6/1977 | Campbell | 179/2 E |
| 4,071,711 | 1/1978 | Beaupre | 370/112 |
| 4,078,154 | 3/1978 | Suzuki et al. | 179/1 SB |
| 4,101,835 | 7/1978 | Taylor et al. | 455/38 |
| 4,122,304 | 10/1978 | Mallien | 179/2 EB |

*Primary Examiner*—Benedict V. Safourek
*Attorney, Agent, or Firm*—Sughrue, Rothwell, Mion, Zinn and Macpeak

[57] ABSTRACT

A mobile radio data communication system in which portable radio terminal units transmit a carrier wave modulated with various data and a stationary radio unit demodulates the modulated carrier wave into the transmitted data is disclosed. The data may relate to such aspects of business activities as production, inventory and sale, and are transmitted as analog speech signals. In order to transmit data, the operator presses a transmission key which causes a preamble digital signal and a terminal number digital signal to be successively transmitted. The operator, while pressing the transmission key, speaks into a microphone contained in the portable radio terminal unit. At the stationary radio unit, the preamble digital signal is recognized and the terminal number digital signal is temporarily stored. The transmitted analog speech signals are supplied to a speech recognition circuit which generates a digital speech signal that is stored in a memory. The stationary radio unit then generates a preamble digital signal which is transmitted followed by the temporarily stored terminal number digital signal and the digital speech signal. The portable radio terminal unit corresponding to the transmitted terminal number digital signal recognizes the preamble digital signal and temporarily stores the transmitted digital speech signal. The digital speech signal is then decoded and displayed to the operator. If the speech recognition circuit has correctly recognized the transmitted analog speech signal, the operator presses an acknowledge key. Otherwise, the operator presses a cancel key. In either case, the preamble digital signal and the terminal number digital signals are again successively transmitted. This time, however, these digital signals are followed by an acknowledge digital signal or a cancel digital signal depending on which key was pressed by the operator. At the stationary radio unit, the preamble digital signal is recognized, and if the acknowledge digital signal was transmitted, the digital speech signal stored in the memory is read out to a processor to be edited and printed out as may be appropriate. On the other hand, if the cancel signal was transmitted, the digital speech signal stored in the memory is prevented from being read out and is instead cleared. In this case, the operator must then retransmit the data.

5 Claims, 3 Drawing Figures

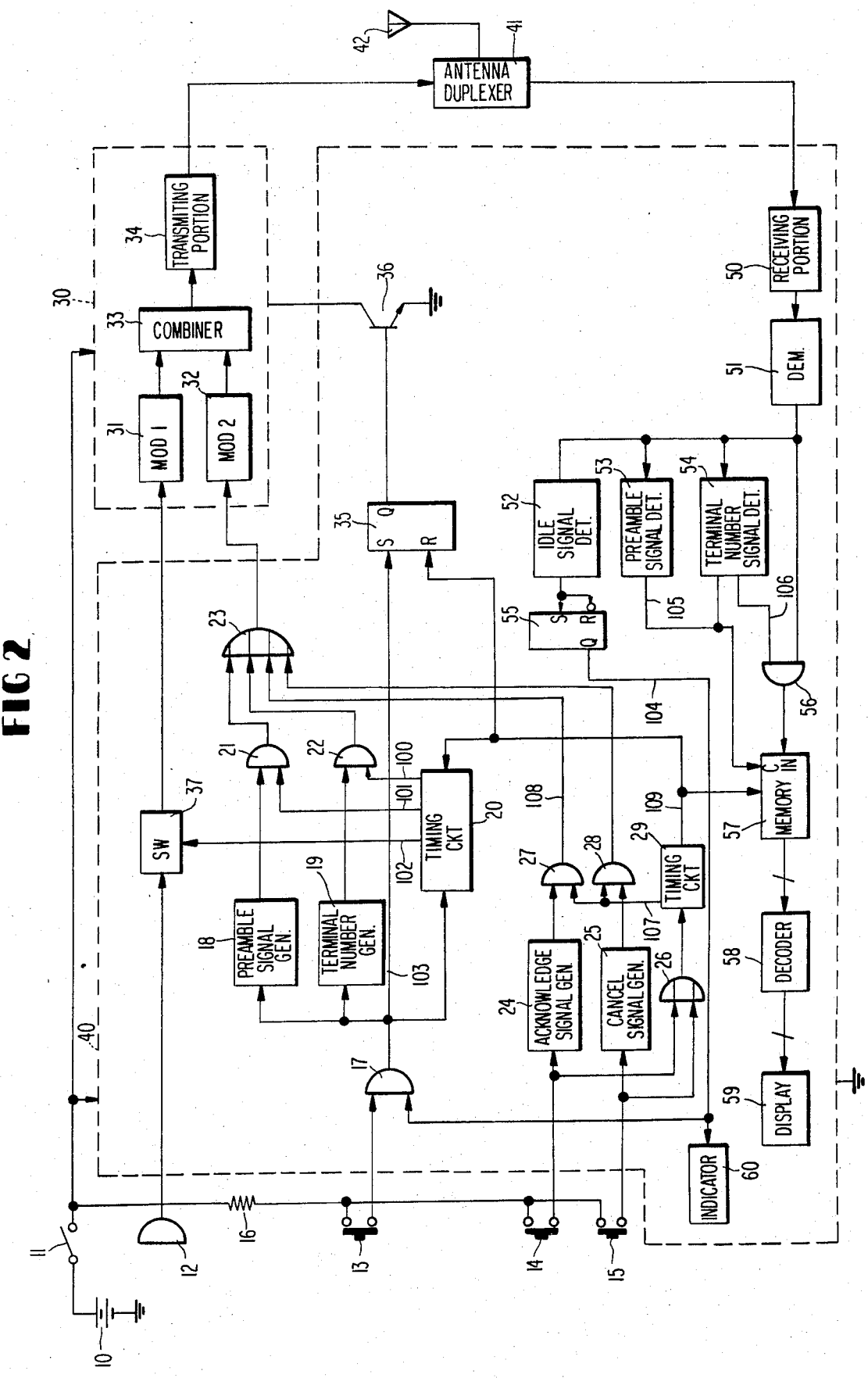

MOBILE RADIO DATA COMMUNICATION SYSTEM

BACKGROUND OF THE INVENTION

This invention relates to a mobile radio data communication system in which portable radio terminal units transmit a carrier wave modulated with various data on such aspects of business activities as production, inventory and sale, while a stationary radio unit demodulates the modulated carrier wave into the transmitted data to appropriately process the data.

A conventional system of this kind (for example the "Radio Terminal System" described by T. Miyamoto et al. in the NEC RESEARCH & DEVELOPMENT, No. 50, pp. 62–68, July 1978) consists of a plurality of portable radio terminal units, a stationary radio unit, a terminal control unit and a computer. Each portable radio terminal unit further comprises a keyboard having 14 data input and seven function keys, a memory for storing data, a display for displaying data and a transmitter and a receiver for transmitting and receiving data, respectively. The stationary radio unit on the other hand comprises a transmitter for transmitting response data and the like from the terminal control unit and a receiver for receiving data from the radio terminal units. In such a system, the operator will enter data with keys on his radio terminal unit and store the data in its memory. The stored data are displayed. Then, as he depresses the transmission key if the idle indicator lamp is on, the stored data are transmitted from the transmitter in the form of, for example, a frequency shift keyed (FSK) wave. The FSK wave is demodulated after it is received by the stationary radio unit, and supplied to the terminal control unit over a wired transmission path.

The terminal control unit first corrects errors, if any, in the received data signals, edits them into a computer-processible format and transfers them to the computer. If any error is found uncorrectible, a response message is sent to the pertinent radio terminal unit via the stationary radio unit, and at the radio terminal unit there is lit an "Error" lamp to demand that the operator retransmit the data. In such an instance, the erroneous data are not transferred to the computer.

The computer, after having processed the transferred data, sends back a response message to the radio terminal unit via the terminal control unit and the stationary radio unit. At the radio terminal unit, the returned acknowlege signal and response message are subjected to error correction, and if the error is found correctible, the "OK" lamp is lit, accompanied by the displaying of the response signal.

When the operator uses a radio terminal unit of such a system while moving around, he has to manipulate the keyboard of the radio terminal unit held in his hands. This is a very cumbersome procedure, and moreover the size of the terminal unit, determined by the keyboard features, tends to be large. Furthermore, the presence of many keys often invites pressing of wrong keys when the operator is moving around. The radio terminal has to be equipped with a coder for converting the contact signals of the keyboard into digital signals and a memory for storing data because a plurality of such signals are transmitted at a time. It also needs a means for illuminating each of the many keys so that the unit can be used even in the dark. These factors, too, contribute to enlarging the size of the radio terminal unit.

SUMMARY OF THE INVENTION

The object of the present invention therefore is to provide a mobile radio data transmission system having compact radio terminal units which are free from th above mentioned disadvantages and permits ready entry of data.

In accordance with this invention, there is provided a mobile radio transmission system having at least one portable radio terminal unit for transmitting speech data and a radio unit for processing these speech data, wherein said portable radio terminal unit includes: a first means for converting said speech data into an electric signal and generating a first analog speech signal; second, third and fourth means for respectively generating a first preamble signal, an acknowledge signal and a cancellation signal in response to first, second and third control signals; a fifth means for generating a plurality of first timing signals in response to said first, second and third control signals, a sixth means for modulating said first preamble signal, said first analog speech signal, said acknowledge signal and said cancellation signal according to said first timing signals to generate first, second, third and fourth modulated waves, respectively; a seventh means for receiving fifth and sixth modulated waves and demodulating them into first and second digital signals, respectively; an eighth means for detecting said first digital signal to generate a first detection signal; a ninth means for storing said second digital signal in response to said first detection signal; and a tenth means for displaying the information stored in said ninth means, and wherein said radio unit includes: an eleventh means for receiving said first, second, third and fourth modulated waves and demodulating them into a third digital signal, a second analog speech signal and fourth and fifth digital signals, respectively; twelfth, thirteenth and fourteenth means for detecting said third, fourth and fifth digital signals to generate second, third and fourth detection signals, respectively; a fifteenth means for recognizing said second analog speech signal to generate a sixth digital signal; a sixteenth means for generating fourth, fifth and sixth control signal in response to said second detection signal, a seventh control signal in response to said third detection signal, and an eighth control signal in response to said fourth detection signal; a seventeenth means for storing, reading out and cancelling said sixth digital signal respectively in accordance with said fourth, fifth and eighth control signals; an eighteenth means for generating a second preamble signal in response to said sixth control signal; a nineteenth means for processing the information stored in said seventeenth means in accordance with said seventh control signal; and a twentieth means successively modulating said second preamble signal and a read-out from said seventeeth means into said fifth and sixth modulated waves, respectively, to transmit them.

BRIEF DESCRIPTION OF THE DRAWINGS

The present invention will be described more in detail hereunder with reference to the accompanying drawings in which:

FIG. 2 illustrates an embodiment of the portable radio unit in this system and;

DESCRIPTION OF THE PREFERRED EMBODIMENT

Figure 1:
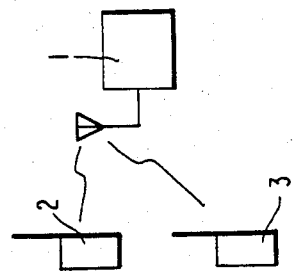
FIG. 1 is an exemplary functional block diagram illustrating the system of this invention.

In FIG. 1, portable radio terminal units 2 and 3 transmit speech data to a radio unit 1. In the radio unit 1, meanwhile, these data are stored in a memory, or the stored data are processed and printed out by a printer. These operations will be described below with reference to FIGS. 2 and 3.

First, the turn-on of the power switch 11 of the radio terminal unit 2 or 3 in FIG. 2 will connect a battery 10 to a resistor 16 and circuit blocks 30 and 40 to activate the circuit block 40, but the circuit block 30 will not be activated due to the turn-off of a transistor 36 as will be explained hereinafter. If, in this state, the radio unit 1 is transmitting a frequency shift-keyed idle signal (to be explained hereinafter), this FSK wave will be received by a receiving portion 50 by way of the antenna 42 and an antenna duplexer 41 of each of the radio terminal units 2 and 3, demodulated by a demodulator (a discriminator, for example) 51 into a digital signal. The digital signal will be detected by an idle signal detector 52. The output of the detector 52 sets a flip-flop 55 to generate a high-level signal 104. This signal 104 serves to turn on an idle indicator (a lamp, for example) 60 for indicating that the radio unit 1 is ready to receive speech data signals from the radio terminal unit 2 or 3. The operator, recognizing that this indicator 60 is on, presses a transmission key 13. The output of the key 13, because the output 104 of the flip-flop 55 is at a high level, passes an AND gate 17 to drive a preamble signal generator 18, a terminal number generator 19 and a timing circuit 20. At the same time it sets a flip-flop 35 to turn on the transistor 36 and cause power to be supplied to the circuit block 30. The timing circuit (which can be composed of a plurality of monostble multivibrators andflip-flops, etc., for example) 20 supplies AND gates 21 and 22 with timing signals 101 and 100, respectively, and sequentially supplies a modulator (an FSK modulator, for example) 32, through an OR gate 23, with a train of pulses, having a prescribed pattern (1010..., for example), from the preamble signal generator 18 and the terminal number generator 19. The FSK wave from this modulator 32 is transmitted to the radio unit 1 by way of a combiner 33, a transmitting portion 34, the antenna duplexer 41 and the antenna 42. Next, a timing signal 102 from the timing circuit 20 causes a switch 37 to be turned on. The speech data from a microphone 12 are supplied to a modulator (an FM modulator, for example) 3. The FM wave from the modulator 31 is transmitted to the raio unit 1 through circuits 33, 34, 41 and 42.

Figure 3:
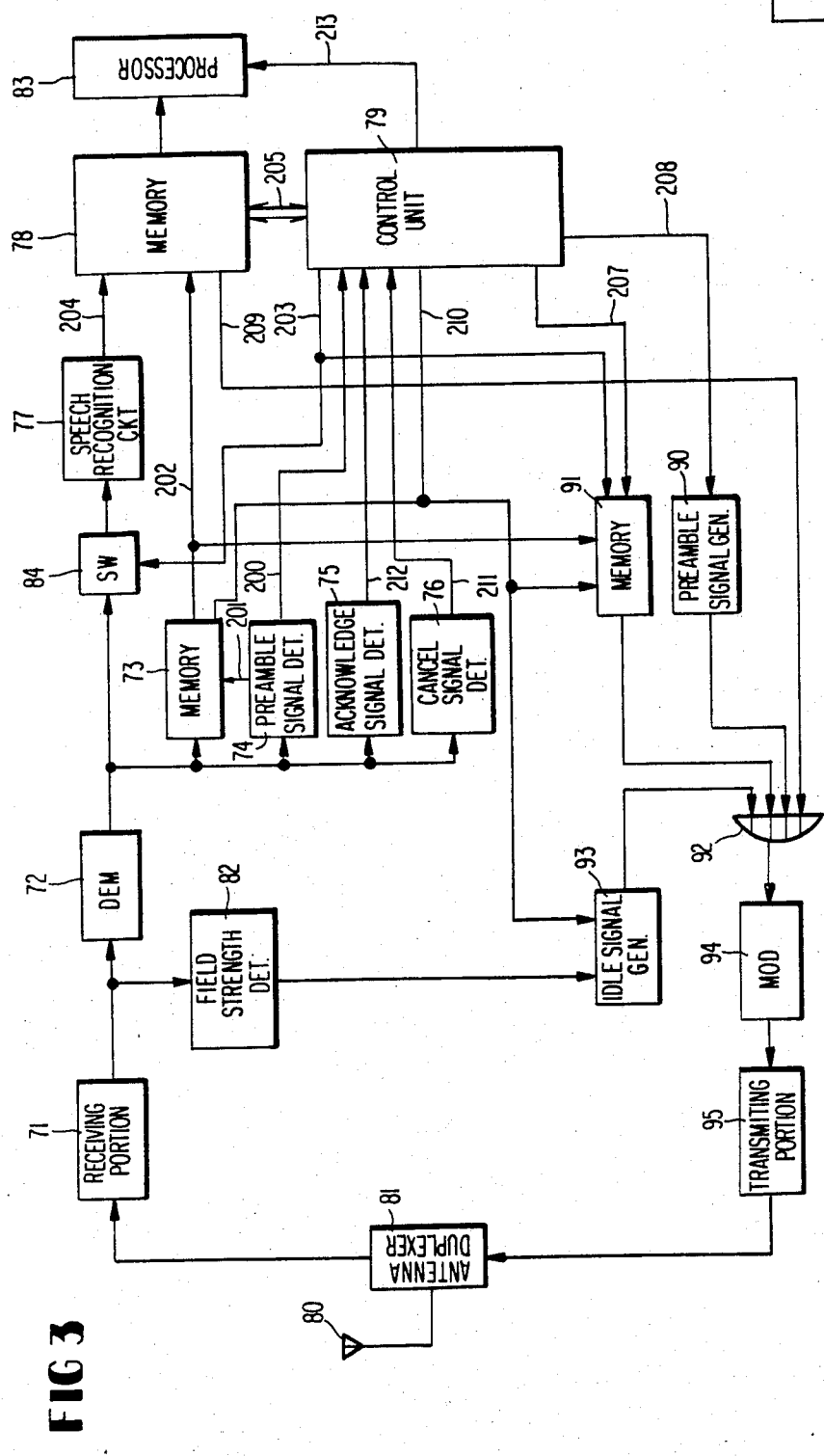
FIG. 3 illustrates an embodiment of the radio unit in this system.

In the radio unit 1 of FIG. 3, on the other hand, as its receiving portion 71 receives, by way of an antenna 80 and an antenna duplexer 81, the FSK wave which was first transmitted, a detector (which can be composed of a rectifier circuit and a means for detecting the output level of this circuit, for example) 82 detects the electric field to mute a generator 93, which is thereby prevented from transmitting an idle signal. A demodulator (a discriminator, for example) 72 demodulates said preamble signal and terminal number. A preamble signal detector 74 is ccomposed of, for example, a clock regenerator, a pattern generator, an exclusive-OR gate for detecting coincidence or non-concendence between the output of this pattern generator and the preamble signal, and a means for counting the output of this gate. This detector 74 detects the preamble signal to generate a detection signal 200, and also generates a clock 201 synchronized with the preamble signal. This clock 201 causes the terminal number following the preamble signal to be stored in a memory (a shift register, for example) 73, whose output 202 designates an address in a memory 78. A control unit 79, upon receiving the detection signal 200, generates a signal 203 which, after the terminal number is stored in the memory 73, causes a switch 84 to be closed and the information stored in the memory 73 to be set in a memory 91. Next, the FM wave is also demodulated by the demodulator 72 into a speech signal, which is supplied to a speech recognition circuit (one example of this type is DP-100 speech input device, manufactured and marketed by Nippon Electric Company, Ltd.) 77 by way of the switch 84. With respect to this speech recognition circuit 77, reference is further made to the U.S. Pat. Nos. 4,049,913 and 4,059,725. The speech recognition circuit 77 recognizes the speech signal, and generates a digital signal 204 corresponding thereto, which, in accordance with a control signal 205 from the control unit 79, is written into the address designated by the signal 202, character by character for instance. Thereupon, the control unit 79 generates a control signal 208 for activating a preamble signal generator 90. The output of the generator 90 is supplied to a modulator (an FSK modulator, for example) 94 through an OR gate 92. Next, the information (or terminal number) stored in a memory 91 is successively read out in accordance with a control signal 207 from the control unit 79 to supply to the modulator 94 through the OR gate 92. Following it, the information written in at the above-mentioned address is successively read out to supply to the modulator 94 through the OR gate 92. The modulator 94 successively modulates the preamble signal, terminal number and digital speech signal to generate FSK waves, which are transmitted to the radio terminal 2 or 3 by way of a transmitting portion 95, the antenna duplexer 81 and the antenna 80.

In the radio terminal unit 2, the FSK waves are received by the receiving portion 50 by way of the antenna 42 and the antenna duplexer 41. The demodulator 5 successively demodulates the received FSK waves into the preamble signal, terminal number and digital speech signal. First, the preamble signal is detected by a preamble signal detector 53 to generate a clock 105, which is supplied to a terminal number detector (which is composed of a pattern generator, an exclusive-OR gate for detecting coincidence or non-coincidence between the output of this pattern generator and the terminal number, and a means for counting the output of this gate, for example) 54 and a memory 57. Next, the terminal number is detected by the terminal number detector 54 to generate a signal 106, which causes and AND gate 56 to be opened and the following digital speech signal to be successively stored in the memory 57. The stored information is decoded by a decoder 58 into signals for display, and supplied to a display 59, which displays digital speech signals from the radio unit 1 so as to check whether or not the speech input from the microphone 12 of the radio terminal unit 2 or 3 has been correctly recognized by the speech recognition circuit 77 of the radio unit 1.

If a returned speech signal is acknowledged to be correct on the display 59, an acknowledge key 14 is pressed to activate an acknowledge signal generator 24 and, through an OR gate 26, a timing circuit 29. An AND gate 27 lets an acknowledge signal from the generator 24 pass for a prescribed period of time in accordance with a timing signal 107 from the timing circuit 29. The output 108 of this gate 27 is modulated into an FSK by the modulator 32, and transmitted to the radio unit 1 through the circuits 33, 34, 41 and 42.

In the radio unit 1, the acknowledge signal is demodulated from the FSK wave by the demodulator 72, and is detected by an acknowledge signal detector 75 to generate a signal 212. The control unit 79, upon receiving this signal 212, generates a control signal 210 to clear the information stored in the memories 73 and 91 and further to activate the generator 93, which thereupon generates an idle signal having a prescribed pattern. The idle signal is supplied to the modulator 94 via the OR gate 92. The modulator 94 modulates this signal into an FSK wave, which is transmitted to the radio terminal units 2 and 3, and the radio unit 1 is thereby set in a stand-by state. Thereupon, the information stored in memories can be processed in accordance with a signal 213 from the control unit 79, edited and printed out by a processor circuit 83.

Meanwhile, in the radio terminal unit 2 or 3, when an acknowledge signal has been transmitted in accordance with the output 109 of the timing circuit 29, the flip-flop 35 is reset. The transistor 36 is turned off to mute the circuit block 30. Further, the memory 57 is cleared, and the timing circuit 29 is reset to return the radio terminal unit to its initial state so that a new speech input can be entered.

In the speech signal indicated on the display 59 is found to be erroneous, a cancel key 15 is pressed to activate a generator 25 and, through the OR gate 26, the timing circuit 29. An AND gate 28 lets a cancellation signal from the generator 25 pass for a prescribed period of time in accordance with the timing signal 107 from the timing circuit 29.

This cancellation signal, like the aforementioned acknowledge signal, is transmitted to the radio unit 1, and detected by a detector 76 to generate a signal 211. The control unit 79, upon receiving this signal 211, clears the memory 78 of the information written in at the aforementioned address thereof and, as described above, generates the signal 210 to set the radio unit 1 in a stand-by state. Meanwhile, the radio terminal unit, again as stated above, is returned to its initial state so that a speech input can be re-entered.

In addition, the modulators 31 and 32 and the combiner 33 in each of the radio terminal units may be replaced with a signal FM modulator. Furthermore, in a system where a single radio terminal unit is matched with a single radio unit, the circuits 19, 22, 52, 54, 55 and 60 of the radio terminal unit illustrated in FIG. 2 can be dispensed with. In such an instance, the circuit block 30, like the circuit block 40, may be constantly supplied with power. The circuit 73, 82, 91 and 93 of the radio unit illustrated in FIG. 3 could also be dispensed with.

As heretofore described, according to this ivention, the radio terminal unit is very simple in operation because it accepts speech inputs and can be made compact because of the very small number of keys it requires. The system of this invention has another advantage of ensuring accurate entry of speech data into the radio unit memory because the returned speech signals are indicated on the display.

What is claimed is:

1. A mobile radio data transmission system having at least one portable radio terminal unit for transmitting speech data and a radio unit for processing of these speech data, wherein said portable radio terminal unit includes:

means for converting said speech data into a first analog speech signal;

means for respectively generating a first preamble signal, an acknowledge signal and a cancellation signal in response to first, second and third control signals;

means for generating a plurality of first timing signals in response to said first, second and third control signals;

means for modulating said first preamble signal, a first analog speech signal, said acknowledge signal and said cancellation signal with said first timing signals to generate first, second, third and fourth modulated waves, respectively;

means for receiving fifth and sixth modulated waves and demodulating them into first and second digital signals, respectively;

means for detecting first digital signal to generate a first detection signal;

means for storing said second digital signal in response to said first detection signal; and means for displaying the information stored in said means for storing said second digital signal, and wherein said radio unit includes:

means for receiving said first, second, third and fourth modulated waves and demodulating them into a third digital signal, a second analog speech signal and fourth and fifth digital signals, respectively;

means for detecting said third, fourth and fifth digital signals to generate second, third and fourth detection signals, respectively;

means for recognizing said second analog speech signal to generate sixth digital signals;

means for generatng fourth, fifth and sixth control signals in response to said second detection signal, a seventh control signal in response to said third detection signal, and an eighth control signal in response to said fourth detection signal;

means for storing, reading out and canceling said sixth digital signal respectively in accordance with said fourth, fifth and eighth control signals;

means for generating a second preamble signal in response to said sixth control signal;

means for processing the information stored in said means for storing, reading out and canceling in accordance with said seventh control signal; and means for successively modulating said secod preamble signal and a read-out signal from said means for storing, reading out and canceling into said fifth and sixth modulated waves, respectively, to transmit them.

2. A mobile radio data transmission system as claimed in claim 1, wherein said portable radio terminal unit includes a plurality of keys for generating said first, second and third control signals, respectively.

3. A mobile radio data transmission system as claimed in claim 1, having two or more portable radio terminal units, wherein each of said portable radio terminals further includes means for generating a terminal number signal in response to said first control signal, said means for modulating also modulating said terminal number signal with said first timing signals to generate a seventh modulated wave, and said means for receiving also receiving an eighth modulated wave and demodulating it into a seventh digital signal, said seventh digital signal being detected by said means for detecting and, in combination with the detection of said first digital signal, generating said first detecting signal; and wherein said radio unit further includes means for temporarily storing and reading out a eighth digital signal respectively in response to said second detection signal and said fifth control signal, said means for receiving also receiving said seventh modulated wave and demodulating it into said eighth digital signal, and said means for successively modulating also modulating said eighth digital signal read out from said means for temporarily storing into said eighth modulated wave between said fifth and sixth modulated waves.

4. A mobile radio data transmission system as claimed in claim 3 where said radio unit further includes means for generating an idle signal whenever said means for receiving at said radio unit is not receiving modulated waves, said means for generating an idle signal being inhibited by an eight control signal from said means for generating control signals in response to said second detection signal, and said means for successively modulating also modulating said idle signal into a ninth modulated wave in the absence of said fifth, sixth and eighth modulated waves; and wherein each of said portable radio units further includes means for detecting a ninth digital signal to generate a fifth detection signal, and fifth detection signal enabling said first contral signal, and said means for receiving at said portable radio unit also receiving said ninth modulated wave and demodulating it into said ninth digital signal.

5. A mobile radio data transmission system claimed in claim 4 wherein each of said portable radio terminal units further includes means for indicating the idle status of said radio unit in response to said fifth detection signal.

* * * * *

UNITED STATES PATENT AND TRADEMARK OFFICE
CERTIFICATE OF CORRECTION

PATENT NO. : 4,247,947
DATED : January 27, 1981
INVENTOR(S) : Tsutomu MIYAMOTO

It is certified that error appears in the above—identified patent and that said Letters Patent is hereby corrected as shown below:

Column 2, line 11, after "radio" insert -- data -- ;

line 57, after "read-out" insert -- signal -- .

Column 3, line 38, delete "monostble" and insert -- monostable -- ;

line 53, delete "raio" and insert -- radio -- .

Column 5, line 5, after "FSK" insert -- wave -- ;

line 31, delete "In" and insert -- If -- ;

line 50, delete "signal" and insert -- single -- .

UNITED STATES PATENT AND TRADEMARK OFFICE
CERTIFICATE OF CORRECTION

PATENT NO. : 4,247,947
DATED : January 27, 1981
INVENTOR(S) : Tsutomu MIYAMOTO

It is certified that error appears in the above—identified patent and that said Letters Patent is hereby corrected as shown below:

Column 8, line 2, delete "eight" and insert -- eighth -- ;

line 9, delete "and" and insert -- said -- .

Signed and Sealed this

Fifth Day of May 1981

[SEAL]

Attest:

RENE D. TEGTMEYER

*Attesting Officer*  *Acting Commissioner of Patents and Trademarks*